United States Patent [19]
Keck et al.

[11] Patent Number: 5,744,885
[45] Date of Patent: Apr. 28, 1998

[54] MODULAR GENERATOR FRAME CONSTRUCTION

[75] Inventors: Richard J. Keck, Clifton Park; Frank Zwack, Sr., Stephentown; Theodore S. Kralovic, Scotia; Thomas E. Van Schaick, Burnt Hills, all of N.Y.

[73] Assignee: General Electric Co., Schenectady, N.Y.

[21] Appl. No.: 794,937

[22] Filed: Feb. 4, 1997

Related U.S. Application Data

[63] Continuation of Ser. No. 357,485, Dec. 16, 1994, abandoned.

[51] Int. Cl.$^6$ .............................. H02K 5/00; H02K 5/04
[52] U.S. Cl. ........................................................... 310/89
[58] Field of Search .................................. 310/89, 91, 58, 310/59; 248/678

[56] References Cited

U.S. PATENT DOCUMENTS

| | | | |
|---|---|---|---|
| 4,399,382 | 8/1983 | Volkrodt | 310/216 |
| 4,642,499 | 2/1987 | Brem | 310/89 |
| 4,754,179 | 6/1988 | Capuano et al. | 310/71 |
| 4,894,573 | 1/1990 | Simpson | 310/217 |
| 5,196,747 | 3/1993 | Kress et al. | 310/89 |
| 5,283,490 | 2/1994 | Nolte et al. | 310/89 |
| 5,357,161 | 10/1994 | Daniels | 310/89 |
| 5,397,950 | 3/1995 | Norbury, Jr. et al. | 310/91 |

*Primary Examiner*—Clayton E. Laballe
*Attorney, Agent, or Firm*—Nixon & Vanderhye

[57] ABSTRACT

The generator frame includes an inner frame module having openings at opposite ends sufficiently large to permit installation of various elements of the stator core, including the laminations and windings. Separate end cap modules having openings for receiving the rotor, as well as integral pedestal supports, are fabricated separately from the inner frame module and later secured, for example, by bolting, to the inner frame. Upon installation of the rotor, a packaged generator is afforded which can be bolted directly to a foundation at the installation site without an intervening base assembly.

4 Claims, 5 Drawing Sheets

MODULAR GENERATOR FRAME CONSTRUCTION

This is a continuation of application Ser. No. 08/357,485, filed Dec. 16, 1994 now abandoned.

TECHNICAL FIELD

The present invention relates to a frame for a generator and particularly relates to a generator frame essentially formed of a three-piece modular construction which does not require conventional I-beam base supports or end shield supports, and facilitates use of low-cost pedestal bearing supports.

BACKGROUND

There are two generally commonly used generator frame constructions. In one such construction, a base assembly is provided comprised primarily of a horizontal rectilinear I-beam structural assembly having an open center for receiving a stator frame core as well as pedestal supports at opposite ends of the open center for supporting the pedestals which, in turn, mount bearings for the generator rotor. The stator core is generally a separate unit which, after fabrication, including installation of laminations, windings and other essential stator core parts, is disposed in the opening in the I-beam base assembly. Subsequently, the rotor is installed, with the rotor pedestals disposed on the pedestal supports of the base. An outer housing is typically disposed over the stator core, rotor and pedestals, and rests on the base assembly. Trunnions are also typically mounted on the base assembly so that the entire generator can be lifted for transport to, and installation at, a working site. While this type of generator frame assembly is uniquely strong and stiff and thereby avoids sagging when the entire generator is lifted, there are substantial drawbacks to this design. Among the disadvantages are the very large weight of the generator frame with its I-beam base assembly. For example, the I-beam base assembly may comprise up to 10% of the overall weight of the generator unit. Additionally, in packaged units, there is always the danger of misalignment of the rotor in the unit as a result of sagging during transportation and/or installation. An I-beam base assembly, however, has the very great advantage of enabling pedestal mounting of the rotor bearings. This is particularly attractive because of the low cost of the I-beam supported pedestal supports and pedestals.

In another conventional generator frame design, end shields are supported by the generator frame. In these designs, a one-piece frame is provided with end shields. Because of the integral nature of the end shields with the frame, the end shield openings must be very large. Otherwise, it is difficult or impossible to provide a frame with sufficient size and strength while simultaneously providing sufficiently large openings to install the necessary elements within the generator frame, i.e., the laminations, windings, etc. Because of the necessity to provide very large openings, the end shields must be very structurally stiff and, hence, are necessarily formed at substantial expense. End shields also require substantial machining, are difficult to shim when locating the bearings, and generally require very tight tolerances during machining operations. While the typical I-beam base assembly and its associated disadvantages are eliminated by using end shields, low-cost pedestal supports or pedestals cannot be used with the end shields because the pedestal supports require substantial structural strength and support without limiting the size of the openings of the end shields. If so limited, interior parts of the generator cannot be moved through the openings for installation as part of the stator core.

DISCLOSURE OF THE INVENTION

In accordance with the present invention, there is provided a generator frame essentially comprised of a three-piece modular construction without an I-beam base assembly or end shields, but which employs the relatively inexpensive pedestal support and pedestal arrangements. Particularly, an inner frame module is formed, for example, of axially spaced planar structural members defining in assembly a substantial chamber open at its opposite ends and forming a stator core. This inner frame module is a stand-alone structural unit and the openings at the opposite ends are sufficiently large to enable installation of the various elements of the generator stator core such as the laminations, windings, etc. A stand-alone drive end cap and an exciter end cap module are provided for securement to the opposite ends of the inner frame module once the stator core has been assembled within the inner frame. Pedestal supports are mounted directly on and are integral with the end cap modules, and are formed to mount on the foundation to support the pedestal bearings and rotor in operation. With this construction, the stator core may be installed in the inner frame module before the end cap modules are secured, for example, by bolts, to the inner frame module at its opposite ends. Because the pedestal supports are integral with and mounted to the end cap modules, the conventional I-beam base assembly is entirely eliminated, along with the disadvantages associated with that assembly, including its very substantial weight. The inner frame module is also provided along opposite sides, with side frame lifting blocks, by which the entire generator can be lifted for transportation and installation as a packaged unit. Consequently, low-cost pedestals and pedestal supports for mounting directly to the foundation may be employed in the present generator frame modular construction without the disadvantage of the heavy I-beam base assembly or the problems associated with employing end shields, including the great expense, need for machining, high tolerances, etc. The pedestals contain bearings on which the rotor is supported for rotation in the generator, and are herein referred to as pedestal bearings.

In a preferred embodiment according to the present invention, there is provided a modular generator frame construction comprising a stand-alone inner frame module having a central opening defining a generator frame axis, the inner frame module being formed generally of transversely extending parallel structural support plates disposed generally perpendicular to the axis and spaced axially one from the other, a stand-alone drive end cap module and a stand-alone exciter end cap module for securement to the inner frame module at opposite ends thereof, each of the drive and exciter end cap modules comprising an end cap frame having a pedestal support integrally formed with and mounted to the end cap frame for mounting and supporting a pedestal bearing, and means for securing the end cap modules to the opposite ends of the inner frame module, respectively.

In a further preferred embodiment according to the present invention, there is provided a method of manufacturing a generator comprising the steps of fabricating a stand-alone inner frame module having a central opening defining a generator frame axis and opening through opposite ends of the inner frame module, installing through at least one of the end openings of the inner frame module a stator core including laminations and windings, fabricating a stand-alone drive end cap module and a stand-alone exciter end cap module each comprising an end cap frame having a pedestal support integrally formed with and mounted to the end cap frame for mounting and supporting a pedestal bearing and an opening for receiving a generator rotor, securing the end cap modules to the inner frame module at opposite ends thereof subsequent to the installation of the stator core in the inner frame, and subsequent to securing the end cap modules to the inner frame inserting the generator rotor through the end cap openings and the inner frame opening for support at its opposite ends on the pedestal bearings.

Accordingly, it is a primary object of the present invention to provide a novel and improved modular generator frame construction employing low-cost bearing supports and pedestal bearing assemblies in a three-piece modular generator frame assembly without a large structural base assembly or end shields.

BEST MODE FOR CARRYING OUT THE INVENTION

Figure 1:
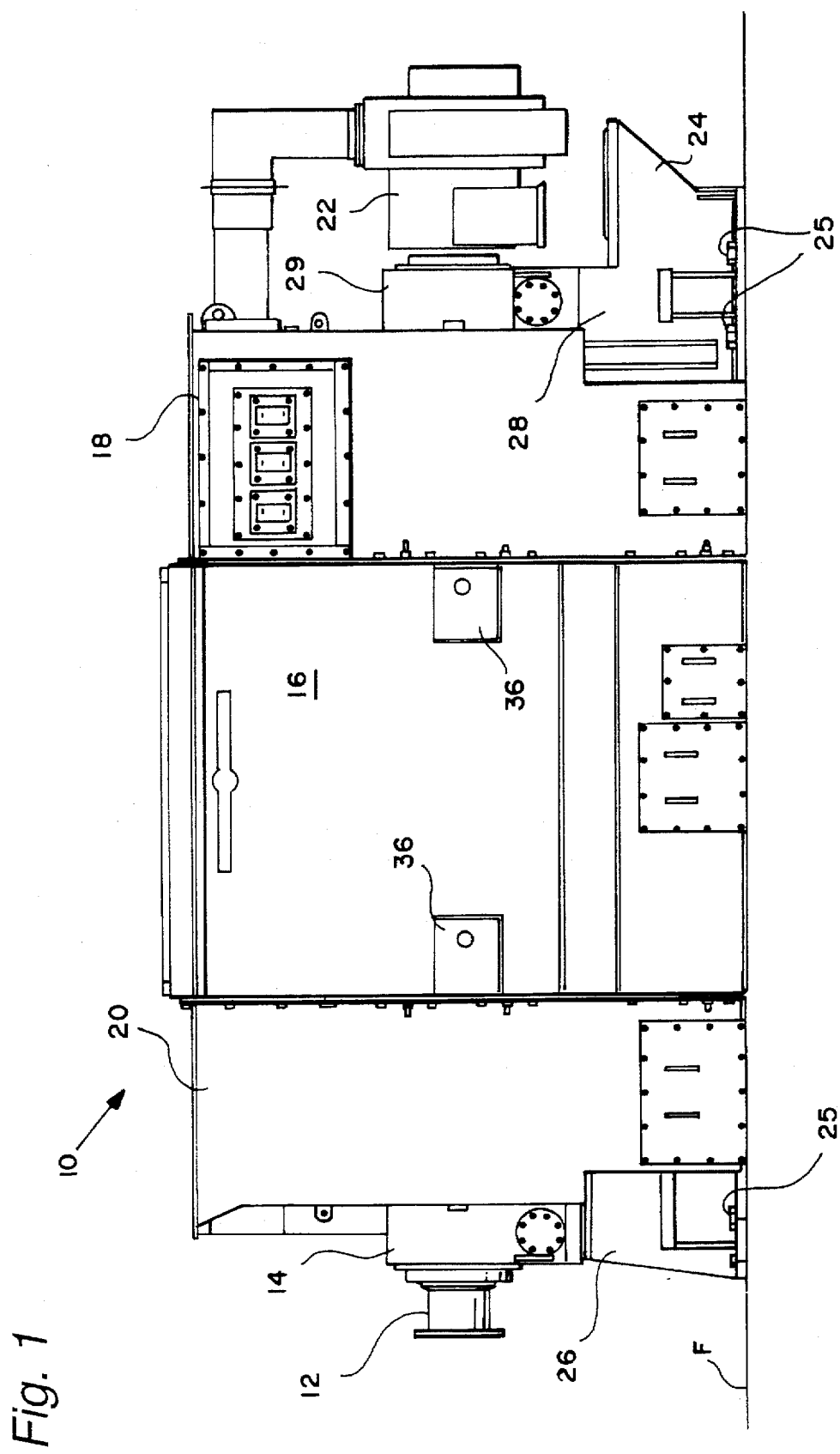
FIG. 1 is a side elevational view of an assembled modular generator frame constructed in accordance with the present invention.
Figure 2:
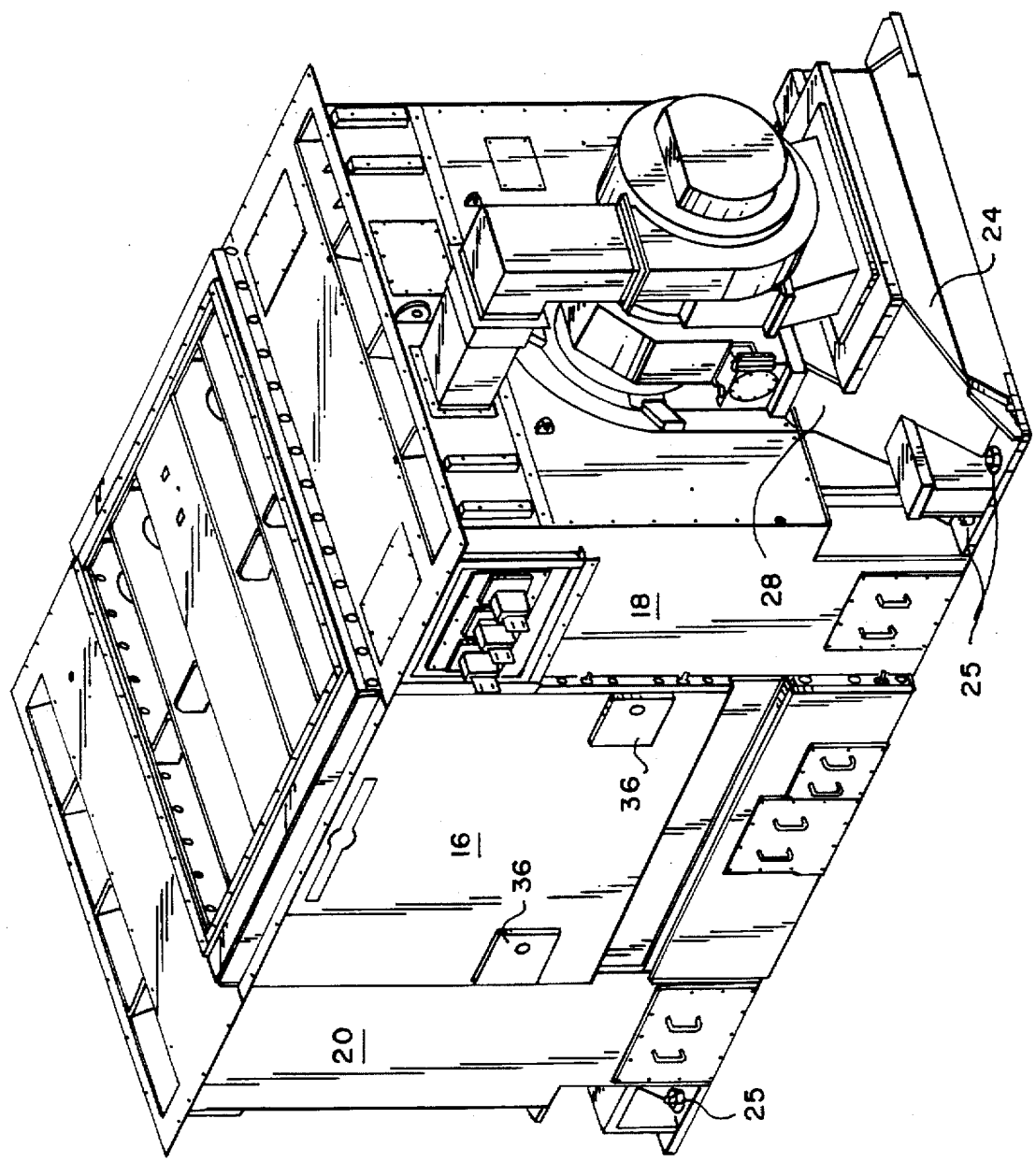
FIG. 2 is a perspective view thereof.

Referring now to the drawings, particularly to FIG. 1, there is illustrated a modular generator frame, generally designated 10, enclosing a rotor 12 having end pedestal bearings 14 and 29 in which the rotor is supported for rotation. The generator frame 10 includes an inner frame 16, an exciter end cap module 18 and a drive end cap module 20. From a review of FIG. 3, it will be appreciated that each of the inner frame module 16 and end cap modules 18, 20 are fabricated as discrete stand-alone modules and, subsequent to installation of the stator core, are assembled with the end cap modules on opposite ends of the inner frame module 16. By stand-alone module is meant a self-supporting structural element of a generator frame having all structural parts necessary for end use of that portion of the frame integrated within the element prior to its assembly with the other elements of the generator frame. As illustrated, an exciter 22 is mounted on an exciter support 24 on the exciter end cap module. Also, it will be noted that there is a pedestal support 26 forming an integral part of the drive end cap module 20 for supporting the pedestal bearing 14. A pedestal support 28 integrally formed with the exciter end module supports the exciter end pedestal bearing 29. Also as illustrated, generator frame 10 is bolted, e.g., by bolts 25, to a foundation floor F directly and without intervening support structure such as an I-beam base assembly, as is typical in certain generator frame constructions previously discussed. In particular, the end cap modules, and the pedestal supports thereon are mounted by the bolts 25 to the foundation floor.

Figure 3:
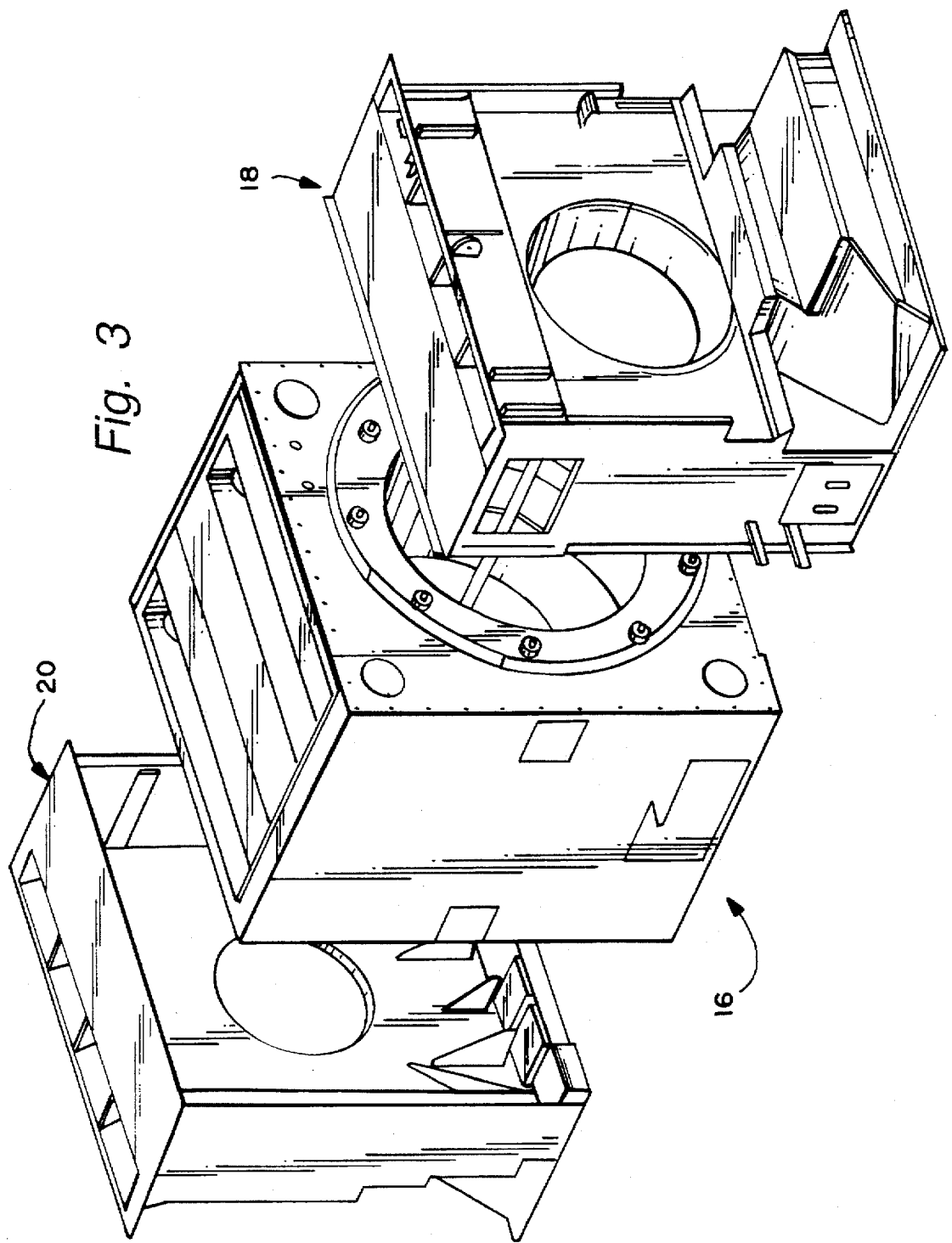
FIG. 3 is a perspective view of the generator frame illustrating the inner modular frame and exciter and drive end caps modules separated from the inner frame module.
Figure 4:
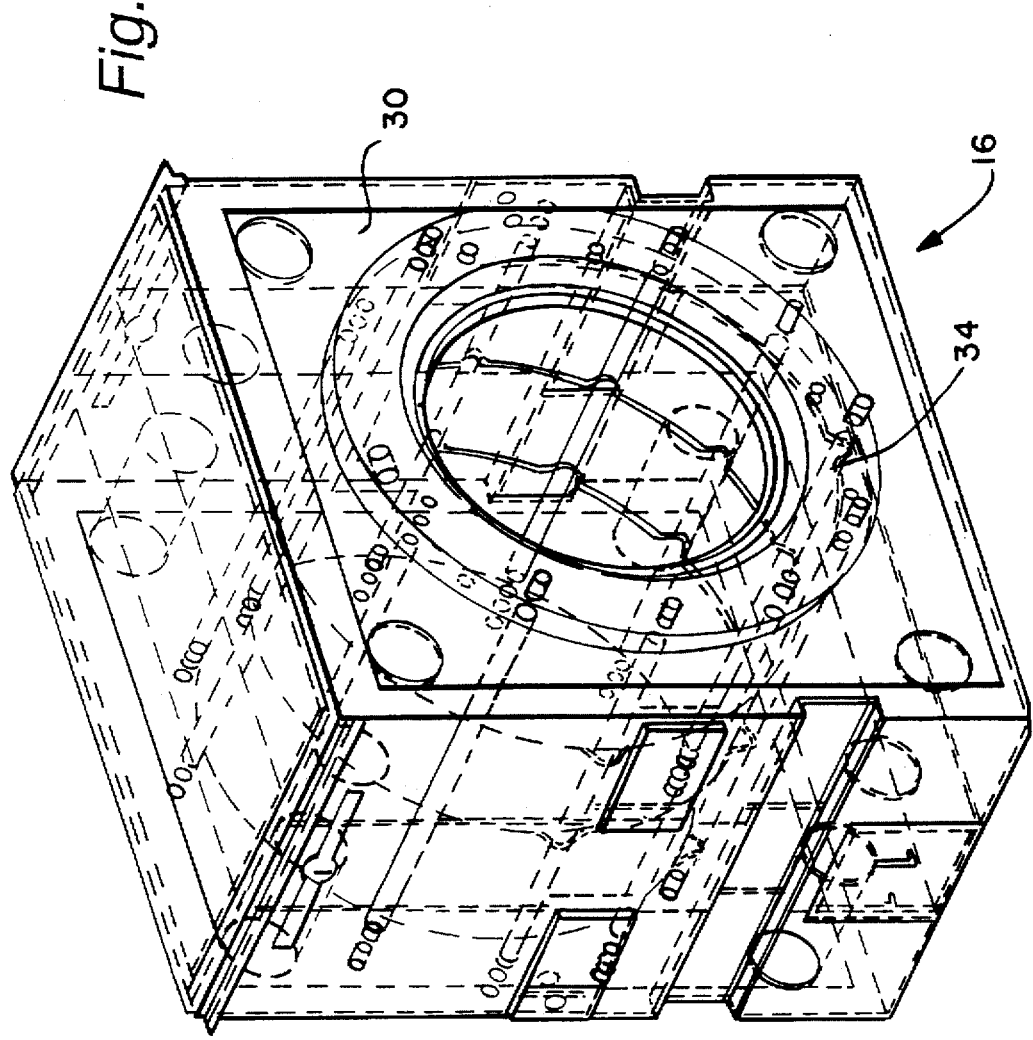
FIG. 4 is a perspective view of the inner frame module.

Referring now to FIGS. 3 and 4, the inner frame module 16 includes a plurality of axially spaced structural support plates 30 having aligned central openings defining a longitudinal generator axis. As illustrated both in FIGS. 3 and 4, the openings are substantial, for example, on the order of about 5 to 10 feet depending on the size of the generator. With the exception of its large end openings, side, bottom and top cover plates fully enclose and form part of inner frame module 16. Within the inner frame module 16 are mounted a plurality of axially extending, circumferentially spaced key bars 34 on which are stacked a series of overlapping segments of steel forming laminations or punchings for the stator core. The key bars maintain alignment of the laminations. As well known in generators, the inside portions of the laminations have slots in which the stator windings are assembled. It will be appreciated that, in accordance with the present invention, the openings for the inner frame module at each of its opposite ends are sufficiently large to enable the installation of the laminations and windings, as well as all other ancillary parts necessary for the stator core. Thus, the inner frame sub-assembly is fabricated to complete the stator core without the end cap modules attached thereto, thus facilitating the stator core fabrication.

Figure 5:
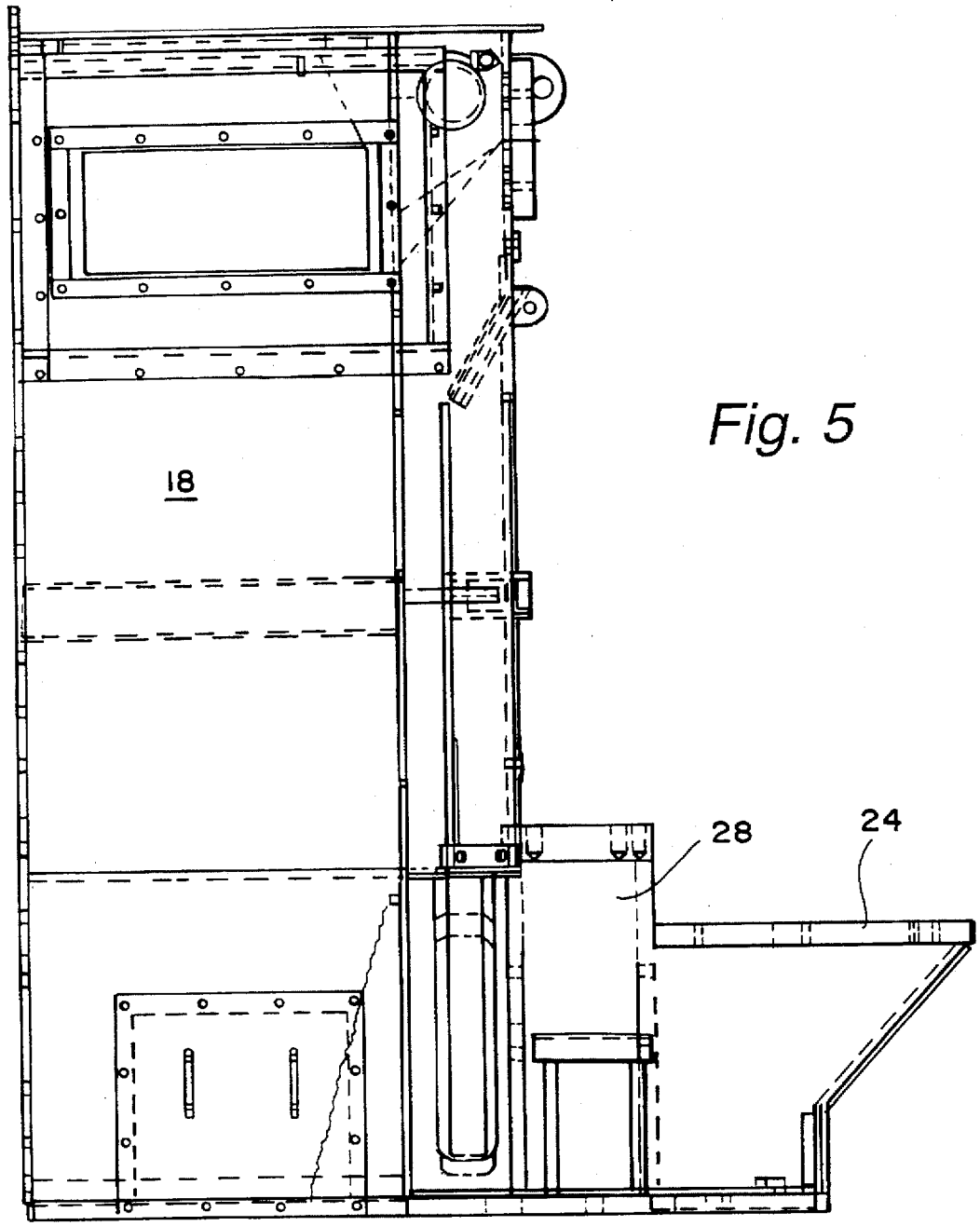
FIG. 5 is a side elevational view of the exciter end cap module.

Referring now to FIGS. 3 and 5, each of the end cap modules are similarly fabricated to form a structural frame. For example, each may have a plurality of transversely extending, axially spaced plates forming a frame with coverings over top, bottom and sides to complete the frame. Obviously, various types of connections and access openings and the like are provided in the end cap modules, as necessary for those elements to complete their structure and function in the generator. In FIG. 5, the exciter end cap module pedestal support 28 is illustrated as forming an integral part of the exciter end cap frame, the exciter pedestal support 24 also being illustrated. The drive end cap module frame is similarly constructed of a series of transversely extending structural plates, with covers on the top, bottom and sides to complete the end cap assembly. As illustrated in FIG. 1, the pedestal support 26 forms an integral part of the drive end cap module and is mounted to the frame thereof. The openings through the end cap modules are reduced in size as compared with the openings through the inner frame module but are sufficiently large for installation of the rotor and mounting of the rotor in its pedestal bearings. The end cap openings have axes coincident with the axis of the opening through the inner frame module.

It will be appreciated that once the stator core has been installed in the inner frame module, the inner frame module and end cap modules may be joined one to the other, for example, by bolts or welds. Once secured to one another, it will be appreciated that there is formed a unitary generator frame comprised of the three frame modules which may be lifted, together with the rotor when installed, as a complete generator package, by use of side lifting blocks 36. In addition, when the frame and in particular the pedestal supports are mounted to the foundation floor, the pedestal supports can support the pedestal bearings and rotor mounted therein during operation of the generator.

To install the rotor, the lower half of the drive end pedestal bearing 14 is bolted to the drive end pedestal support 26, leaving the top half of the pedestal bearing off. On the exciter end, the pedestal bearing 29 is mounted entirely on the rotor 12 and hung from the rotor during installation. With the lower half of the drive end pedestal bearing bolted to the drive end pedestal support at the drive end of the generator frame, the rotor is inserted, for example, from right to left as illustrated in FIG. 1, such that the rotor end which has passed through the inner frame module and the end cap modules seats on the drive end pedestal bearing. To complete the installation of the rotor, the pedestal bearing 29 hanging from the opposite rotor end may be bolted to the exciter end pedestal support 28. The upper half of the drive end pedestal bearing may then be secured to the lower half.

It will be appreciated from the foregoing that the benefits of employing low-cost pedestal supports and pedestal bearing are obtained in this construction and without the necessity of providing a separate structural base support assembly. Concurrently, there is sufficient space available at the opposite ends of the generator frame to permit installation of a pedestal support and pedestal bearing arrangement, while simultaneously enabling the stator core to be installed within the inner frame module. This three-part modular construction with pedestal supports integral with the end cap modules lowers both the cost and weight of the generator and facilitates fabrication of the generator.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A modular generator frame construction for fabricating a generator having a rotor comprising:

a stand-alone inner frame module having a central opening defining a generator frame axis;

a stand-alone drive end cap module and a stand-alone exciter end cap module for securement to said inner frame module at opposite ends thereof, each of said drive and exciter end cap modules comprising an end cap frame having an opening and a pedestal support integrally formed with and mounted on said end cap frame for mounting and supporting a pedestal bearing;

means for securing said end cap modules to the opposite ends of said inner frame module, respectively;

said inner frame module being formed generally of structural support plates disposed generally perpendicular to said axis and spaced axially one from the other; and said structural support plates of said inner frame module including a support plate at each of the opposite ends thereof each having an opening defining part of said central opening through said inner frame module, said openings through said end cap frames being smaller in diameter than the central opening through the inner frame and said openings through structural support plates thereof, said openings through said end cap frames being of a size sufficient to permit the rotor to be inserted through said end cap openings after the end cap modules are secured to the inner frame.

2. A modular generator frame construction according to claim 1 wherein each of said end cap modules includes at least one transversely extending support plate disposed generally perpendicular to said axis.

3. A generator frame according to claim 1 wherein said pedestal supports are formed to mount to a foundation to support said pedestal bearings.

4. A modular generator frame construction according to claim 1 including at least part of a pedestal bearing mounted on one of said pedestal bearing supports for receiving the rotor.

* * * * *